(12) United States Patent
Lu et al.

(10) Patent No.: US 9,199,557 B2
(45) Date of Patent: Dec. 1, 2015

(54) SEAT ANGLE ADJUSTMENT DEVICE AND SEAT HAVING THE SAME

(75) Inventors: Jian Lu, Xiangfan (CN); Xianhu Luo, Xiangfan (CN); Wende Huo, Xiangfan (CN); Wenxue Du, Xiangfan (CN); Jian Du, Xiangfan (CN)

(73) Assignee: HUBEI AVIATION PRECISION MACHINERY TECHNOLOGY CO., LTD., Xiangfan, Hubei (CN)

( * ) Notice: Subject to any disclaimer, the term of this patent is extended or adjusted under 35 U.S.C. 154(b) by 0 days.

(21) Appl. No.: 14/236,246

(22) PCT Filed: Jul. 23, 2012

(86) PCT No.: PCT/CN2012/079019
§ 371 (c)(1),
(2), (4) Date: Jan. 30, 2014

(87) PCT Pub. No.: WO2013/026338
PCT Pub. Date: Feb. 28, 2013

(65) Prior Publication Data
US 2014/0159458 A1 Jun. 12, 2014

(30) Foreign Application Priority Data
Aug. 24, 2011 (CN) .......................... 2011 1 0248268

(51) Int. Cl.
*B60N 2/235* (2006.01)
(52) U.S. Cl.
CPC ..................................... *B60N 2/2356* (2013.01)
(58) Field of Classification Search
CPC ..................................................... B60N 2/2356
USPC .............................. 297/367 R, 367 P, 367 L
See application file for complete search history.

(56) References Cited

U.S. PATENT DOCUMENTS 5,249,840 A 10/1993 Hoshihara et al.
6,328,383 B2 * 12/2001 Rohee et al. .............. 297/367 R
(Continued)

FOREIGN PATENT DOCUMENTS

| CN | 1264655 | 8/2000 |
|---|---|---|
| CN | 1785710 A | 6/2006 |
| CN | 1830696 | 9/2006 |
| CN | 201105675 Y | 8/2008 |
| CN | 101959441 A | 1/2011 |
| CN | 101959442 A | 1/2011 |
| CN | 201729081 U | 2/2011 |
| CN | 102099221 A | 6/2011 |
| CN | 202243072 | 5/2012 |
| DE | 101 38 200 | 2/2003 |
| GB | 2 333 951 | 8/1999 |
| JP | 07-265154 | 10/1995 |

OTHER PUBLICATIONS

Gao, Z. et al., "Mechanism and Machine Theory", *Press of Huazhong University of Science and Technology*, 127-135 (Mar. 31, 2011), English translation.

*Primary Examiner* — Rodney B White
(74) *Attorney, Agent, or Firm* — Merchant & Gould P.C.

(57) ABSTRACT

A seat angle adjustment device includes a ratchet wheel, a stop plate, a locking slipper and a pawl, wherein a first stop position limiting part and a second stop position limiting part are arranged on the stop plate, when the first stop position limiting part is subjected to a rotating torque in a rotational direction, the locking slipper in a locking position circumferentially abuts against the first stop position limiting part; when the rotating torque is higher than a first preset torque value, the pawl in an extended state is driven by the ratchet wheel to rotate until the tooth part on one side of the pawl is completely engaged with the ratchet wheel; and when the rotating torque is higher than a second preset torque value, the second stop position limiting part abuts against the pawl. A seat having the seat angle adjustment device is also provided.

18 Claims, 13 Drawing Sheets

(56) References Cited

U.S. PATENT DOCUMENTS

| | | | |
|---|---|---|---|
| 6,561,585 B2* | 5/2003 | Cilliere et al. | 297/367 R |
| 7,165,813 B2* | 1/2007 | Tame | 297/367 R |
| 7,354,109 B2* | 4/2008 | Oki | 297/367 R |
| 7,967,385 B2* | 6/2011 | Cillierre et al. | 297/367 P |
| 2002/0053825 A1* | 5/2002 | Reubeuze et al. | 297/367 |
| 2003/0184143 A1* | 10/2003 | Cilliere et al. | 297/367 |
| 2004/0036338 A1* | 2/2004 | Lardais et al. | 297/367 |
| 2004/0061369 A1* | 4/2004 | Reubeuze et al. | 297/367 |
| 2004/0066078 A1* | 4/2004 | Matsuura et al. | 297/367 |
| 2008/0231103 A1 | 9/2008 | Rohee | |
| 2009/0236892 A1 | 9/2009 | Cillierre et al. | |
| 2010/0109408 A1 | 5/2010 | Ohba | |
| 2010/0219669 A1 | 9/2010 | Yamada et al. | |
| 2010/0231022 A1* | 9/2010 | Kim et al. | 297/367 R |

\* cited by examiner

SEAT ANGLE ADJUSTMENT DEVICE AND SEAT HAVING THE SAME

The present application is a National Stage Application of PCT/CN2012/079019, filed 23 Jul. 2012, which claims the benefit of priority to Chinese Patent Application No. 201110248268.3, titled "SEAT ANGLE ADJUSTMENT DEVICE AND SEAT HAVING THE SAME", filed with the Chinese State Intellectual Property Office on Aug. 24, 2011. Both of which applications are incorporated herein by reference in their entireties. To the extent appropriate, a claim of priority is made to each of the above disclosed applications.

TECHNICAL FIELD

The present application relates to a seat with an angle-adjustable seat back, and particularly to a seat angle adjustment device and a seat having the same.

BACKGROUND

A seat angle adjuster is used to connect a seat base with a seat back of an automobile seat so as to improve the comfort of the seat. Passengers can adjust an angle of the seat back to be in an optimum position via the seat angle adjuster so as to achieve the most comfortable and accustomed sitting angle. The driver can adjust the angle of the seat back to obtain the best view so as to facilitate controlling manipulation components such as a steering wheel, a pedal or a gear lever.

With the development of the automobile industry and the gradually increased requirements of the customers, higher demands are imposed on the high strength and the high energy absorption performance of the automobile seat. It also needs to improve the strength and the energy absorption performance of the seat angle adjustment device as one of core members of the automobile seat, so as to effectively protect the passengers during a rearward or forward collision to the automobile.

Particularly, for an individual seat with a safety-belt anchoring point located on the seat back, such as a military vehicle seat, a bus seat, an off-road vehicle seat, a commercial vehicle seat, since the vehicle body of such vehicle is relatively high and wide, the safety-belt anchoring point can not be directly mounted on the vehicle body, but has to be mounted at a top end portion of the seat back. It is well known that, when a car experiences a frontal impact, an impact acceleration applied to the passengers may generally reach 16 g to 35 g (according to the National Automobile Forward Collision Impact Test Standard). Apparently, the requirement for the strength and energy absorption performance of the seat angle adjustment device with the safety-belt anchoring point located at the seat back is even higher.

Reference is made to FIG. 1, which is a schematic view showing the structure of a typical seat angle adjustment device with a ratchet wheel slider structure in a locked state.

As shown in FIG. 1, a slider 1 in this solution has two self-locking surfaces 11, 12, and a locking cam 2 also has two self-locking surfaces 21, 22 respectively corresponding to the two self-locking surfaces 11, 12 of the slider 1. When the seat angle adjustment device is in a normal locked state, the two self-locking surfaces 11, 12 of the slider 1 come into contact with the two self-locking surfaces 21, 22 of the locking cam 2 respectively to form a self-lock; and the two self-locking surfaces 11, 12 are located at two sides of a normal line of the slider 1. In a case that the seat back is loaded, since the self-locking surfaces 11, 12 are located at two sides of the normal line of the slider 1 respectively, both of the two self-locking surfaces 11, 12 support the slider 1 at the same time when a ratchet wheel 4 is subjected to a force (i.e. the seat back is subjected to a force), thus forming a two-point locking, which may effectively prevent the slider 1 from inclining, and ensure an appropriate number of engaged teeth between a toothed part 13 of the slider 1 and a toothed part 41 of the ratchet wheel 4, thereby ensuring the strength of the adjustment device.

However, such seat angle adjustment device only has a one-level strength, that is, when the slider 1 and the ratchet wheel 4 are damaged due to the force applied therebetween reaches a certain extent, the seat back will be toppled. Therefore, such angle adjustment device can only meet the requirement of a normal automobile seat that is not a seat with a safety-belt anchoring point located on a seat back.

For solving the above problem of the seat angle adjustment device having the one-level strength, a seat angle adjustment device having a two-level strength is disclosed in a Chinese patent application Publication No. CN1264655. Reference is made to FIG. 2, which is a schematic view showing an overall structure of the seat angle adjustment device.

The seat angle adjustment device shown in FIG. 2 is in a normal locked state, teeth of a slider 11 engage with teeth of a ratchet wheel 8, a self-locking surface of a locking cam 16 abuts against a self-locking surface of the slider 11 to form a self-clock, and the slider 11 is unslidable in a slide groove of a stop plate 5. In this state, teeth of a pawl 25 are disengaged from the teeth of the ratchet wheel 8. When the device is subjected to a relatively large load, since the teeth of the ratchet wheel 8 engage with the teeth of the slider 11, the ratchet wheel 8 may drive the slider 11 to move, and a side edge of the slide groove of the stop plate 5 may be extruded by a side edge of the slider 11 to be deformed, thus a protrusion 14, forming the slide groove, on the stop plate 5 will be pressed to move, and then the pawl 25 is pushed by the other side edge of the protrusion 14 outwards until the teeth of the pawl 25 is engaged with the teeth of the ratchet wheel 8. Reference is made to FIG. 3, which is a schematic view showing a rotating mechanism of a vehicle after an accident.

In the above process of force loading, it is under a first-level strength in an initial state of force loading, and it is under a second-level strength when the pawl 25 is engaged with the ratchet wheel 8 after the loaded force reaches a certain extent. However, when the second-level strength is enabled, the pawl 25 is pushed to engage with the ratchet wheel by the deformed protrusion 14 of the stop plate 5, thus the manufacturing precision of each part will affect the reliable engagement between the pawl and the ratchet wheel which are in a disengaged state, and affect the energy absorption performance when the car is subjected to an impact, and further affect the use security and reliability. Meanwhile, there are inevitable performance differences between materials in different batches, and materials with different mechanical performances have different degrees and tendencies of deformation, therefore, this solution also has high requirements for the mechanical performances of materials.

In view of this, it is desired to optimize the seat angle adjustment device so as to solve the above defects in the prior art.

SUMMARY

In view of the above defects, a technical problem to be solved by the present application is to provide a seat angle adjustment device with an optimized structure, which may reduce the requirement for machining precision of parts and control the product manufacturing cost on the basis of ensuring great overall strength and energy absorption performance. Further, the present application also provides a seat with the seat angle adjustment device.

The seat angle adjustment device according to the present application includes:

a ratchet wheel and a stop plate rotatable coaxially; and at least one locking slider configured to be movable radially with respect to the ratchet wheel between a locked position and a retracted position, wherein, at the locked position, a toothed part of the locking slider is engaged with a toothed part of the ratchet wheel, and a circumferential relative position between the ratchet wheel and the stop plate is fixed, and at the retracted position, the toothed part of the locking slider is disengaged from the toothed part of the ratchet; wherein the seat angle adjustment device further includes:

at least one pawl configured to be movable radially with respect to the ratchet wheel between an extended position and a retracted position, wherein at the extended position, a toothed part of the pawl is semi-engaged with the toothed part of the ratchet wheel, and at the retracted position, the toothed part of the pawl is disengaged from the toothed part of the ratchet wheel; and a driving device configured to selectively drive the locking slider to be at the locked position or the retracted position, and to selectively drive the pawl to be at the extended position or the retracted position; and wherein, a first stopping and position-limiting part and a second stopping and position-limiting part are arranged on the stop plate and are respectively located at a downstream side of a rotational direction of the locking slider and a downstream side of a rotational direction of the pawl; and the first stopping and position-limiting part is configured to abut against the locking slider at the locked position circumferentially in a case that the locking slider is subjected to a rotational torque in the rotational direction;

in a case that the rotational torque is greater than a first preset torque value, the first stopping and position-limiting part is configured to generate a circumferential deformation under the action of the locking slider, and the pawl at the extended position is configured to be driven by the ratchet wheel to rotate until a toothed part at one side of the pawl is fully engaged with the ratchet wheel; and in a case that the rotational torque is greater than a second preset torque value, the second stopping and position-limiting part is configured to abut against the pawl, and the second preset torque value is greater than the first preset torque value.

Preferably, the circumferential deformation is a plastic deformation.

Preferably, the driving device includes a locking cam and an unlocking cam rotatable coaxially, wherein, the locking cam includes a first locking contour surface and a second locking contour surface, the first locking contour surface is configured to be rotatable in a first rotational direction and drive the locking slider to move radially to the locked position, and the locking slider at the locked position abuts against the first locking contour surface at a self-locking point, the second locking contour surface is configured to be rotatable in the first rotational direction and drive the pawl to move radially to the extended position, and the pawl at the extended position is configured to be driven by the ratchet wheel to rotate around a self-locking point between the pawl and the second locking contour surface until the toothed part on one side of the pawl is fully engaged with the ratchet wheel; and the unlocking cam includes a first unlocking contour surface and a second unlocking contour surface, the first unlocking contour surface is configured to be rotatable in a second rotational direction and drive the locking slider to move radially to the retracted position, and the second unlocking contour surface is configured to be rotatable in the second rotational direction and drive the pawl to move radially to the retracted position.

Preferably, the first locking contour surface consists of two contour surfaces spaced apart circumferentially.

Preferably, the driving device further includes a shaft rotatable coaxially with the locking cam and the unlocking cam, and an elastic returning member pre-compressed and arranged between the shaft and the stop plate, and the elastic returning member is configured to generate a tendency for driving the shaft to rotate in the first rotational direction after being pre-compressed.

Preferably, there are two elastic returning members symmetrically arranged with respect to a rotation center in a radial direction.

Preferably, the elastic returning members are spiral springs mounted on the shaft, inner side fixed ends of two spiral springs are configured to be rotatable coaxially with the shaft, and outer side torque bearing ends of the two spiral springs are symmetrically arranged in the radial direction and rotatable coaxially with the stop plate.

Preferably, each of the first unlocking contour surface and the second unlocking contour surface is an outer side groove wall of a special-shaped groove arranged on the unlocking cam circumferentially; and each of the locking slider and the pawl has a boss extending axially and inserted into the corresponding special-shaped groove, and each boss abuts against the outer side groove wall of the corresponding special-shaped groove in the radial direction.

Preferably, a number of each of the locking slider, the first stopping and position-limiting part, the pawl and the second stopping and position-limiting part is three, and the three locking sliders, and the three first stopping and position-limiting parts, the three pawls and the three second stopping and position-limiting parts are arranged in sequence at intervals circumferentially; side surfaces, for cooperating with the locking slider, of the first stopping and position-limiting part and the second stopping and position-limiting part are parallel to each other and arranged symmetrically with respect to the rotation center.

Preferably, side surfaces, for cooperating with a side of the pawl near the rotation center, of the first stopping and position-limiting part and the second stopping and position-limiting part are parallel to each other and arranged symmetrically with respect to the rotation center; and a side surface, for cooperating with a side of the pawl away from the rotation center, of the second stopping and position-limiting part is configured to abut against the pawl in a case that the rotational torque is greater than the second preset torque value.

Preferably, the ratchet wheel has a first projection part extending outwards axially, and the stop plate has a second projection part extending outwards axially; and the first projection part and the second projection part are configured to be respectively connected to a seat back and a seat base which are hinged together, or to the seat base and the seat back which are hinged together.

Preferably, the seat angle adjustment device further includes a jacket fixedly connected to the stop plate, wherein the jacket is mounted outside the ratchet wheel, and a clearance fit is formed between the jacket and the ratchet wheel.

The seat according to the present application includes a seat back and a seat base which are hinged together, and a seat angle adjustment device connected between the seat back and the seat base, wherein the seat angle adjustment device is the seat angle adjustment device as described above.

In use, when the seat back is subjected to a relatively large impact (e.g., the car is subjected to a forward collision or a rearward collision), the seat angle adjustment device according to the present application may realize graded strength enhancement via the locking slider and the pawl. Firstly, the locking slider bears load, and when the rotational torque acting on the locking slider reaches the first preset torque value, the first stopping and position-limiting part at the downstream side of the locking slider is pressed by the locking slider to be deformed, and then the ratchet wheel drives the pawl to rotate until the toothed part on one side of the pawl is fully engaged with the toothed part of the ratchet wheel. When the rotational torque is further increased to the second preset torque value, the pawl is driven by the ratchet wheel to abut against the second stopping and position-limiting part at the downstream side of the pawl to form a rigid contact, and in this state, the strength of the pawl functions, which further enhances the overall strength of the adjusting device. Apparently, since the strength enhancement varies progressively in two levels, the strength of the seat back at the moment the automobile being impacted is gradually changed, thus the impact force caused by the collision of the automobile may be buffered, thereby reducing the impact force on a human body while absorbing a large amount of energy, and greatly improving the safety performance.

Compared with the prior art, in this solution, the initial state of cooperation between the pawl and the ratchet wheel is semi-engagement, i.e., the toothed parts of the pawl and the ratchet wheel cross in the radial direction and have a certain gap therebetween. In the bearing process under the first-level strength, the pawl in the semi-engaged state is driven by the ratchet wheel to rotate until the toothed part on one side of the pawl is fully engaged with the ratchet wheel. In this process, the pawl bears a part of the strength, and is also in a preparatory posture for the bearing under the second-level strength. Based on the above analysis, on one hand, due to the improved structure of this solution, the switching of the working posture of the pawl is very liable in a process from participating partly in the strength enhancement to participating maximally in the strength enhancement, and the machining precision of related parts can be adjusted properly, thereby effectively controlling the manufacturing cost of products. On the other hand, the application of this solution has no special requirements for material properties. In addition, in the locking process, since the pawl is not fully engaged with the ratchet wheel at the final stage, problems, such as tooth interference, tooth fitting, caused by too many engagement members can be avoided. Compared with the prior art that the pawl is fully engaged with the ratchet wheel, in this solution, a part of the toothed part of the pawl under load is engaged with the ratchet wheel, thereby significantly increasing the movement performance of the whole mechanism.

In a preferred solution of the present application, two elastic returning members symmetrically arranged with respect to the shaft in a radial direction are provided to provide a driving force for returning to the locked position from the unlocked position. In this way, lateral forces on two sides generated during the returning process can be offset by each other, thereby reducing the lateral friction force inside the angle adjustment device, and making the locking process and the unlocking process smoother. Also, in the normal locked state, the positions of inside parts are better, thereby further increasing the working reliability of the angle adjustment device.

The seat angle adjustment device according to the present application is adaptable for various seats with an angle-adjustable seat back, in particular for an automobile seat having higher strength requirement, for example an individual seat with a safety-belt anchoring point located on the seat back, such as a military vehicle seat, a bus seat, an off-road vehicle seat.

Figure 1:
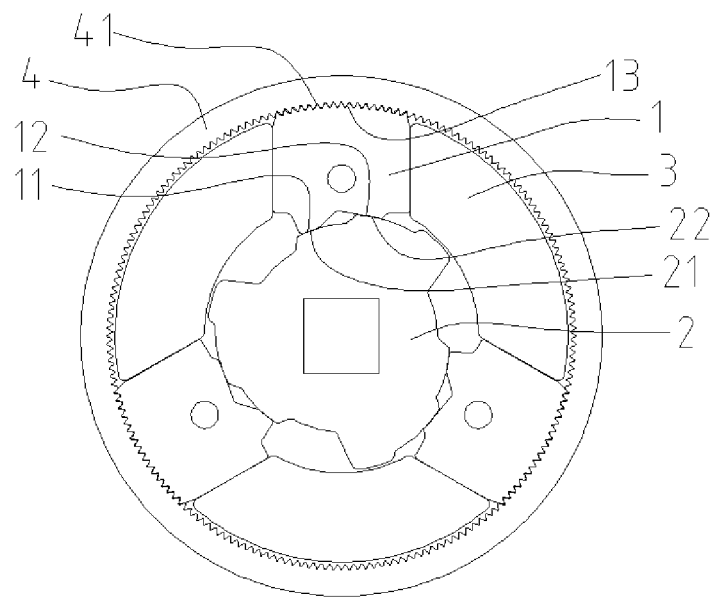
FIG. 1 is a schematic view showing the structure of a typical seat angle adjustment device with a ratchet wheel slider structure in a locked state.
Figure 2:
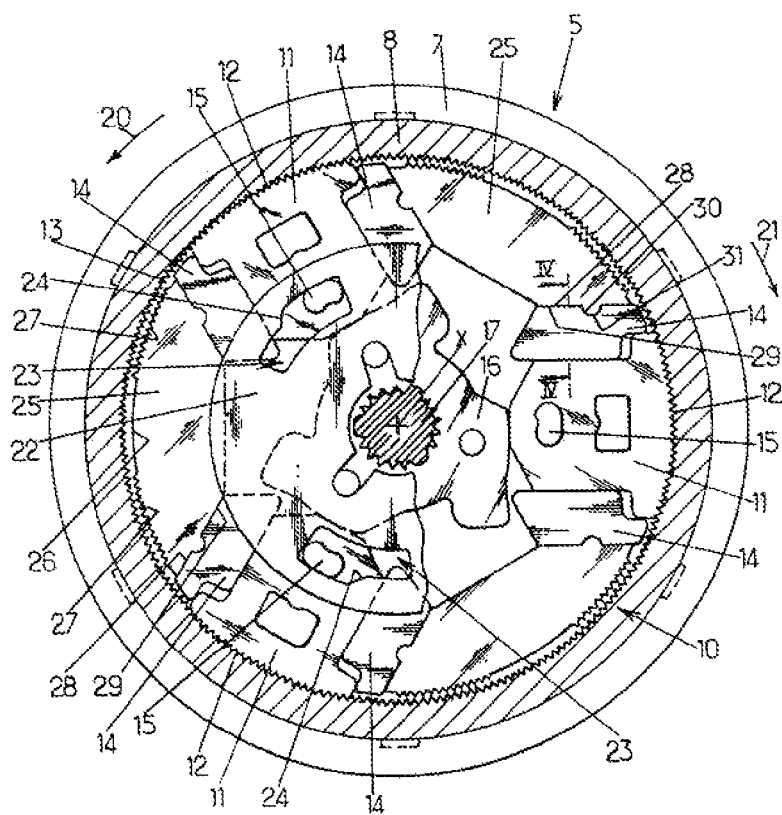
FIG. 2 is a schematic view showing an overall structure of another seat angle adjustment device having a two-level strength.
Figure 3:
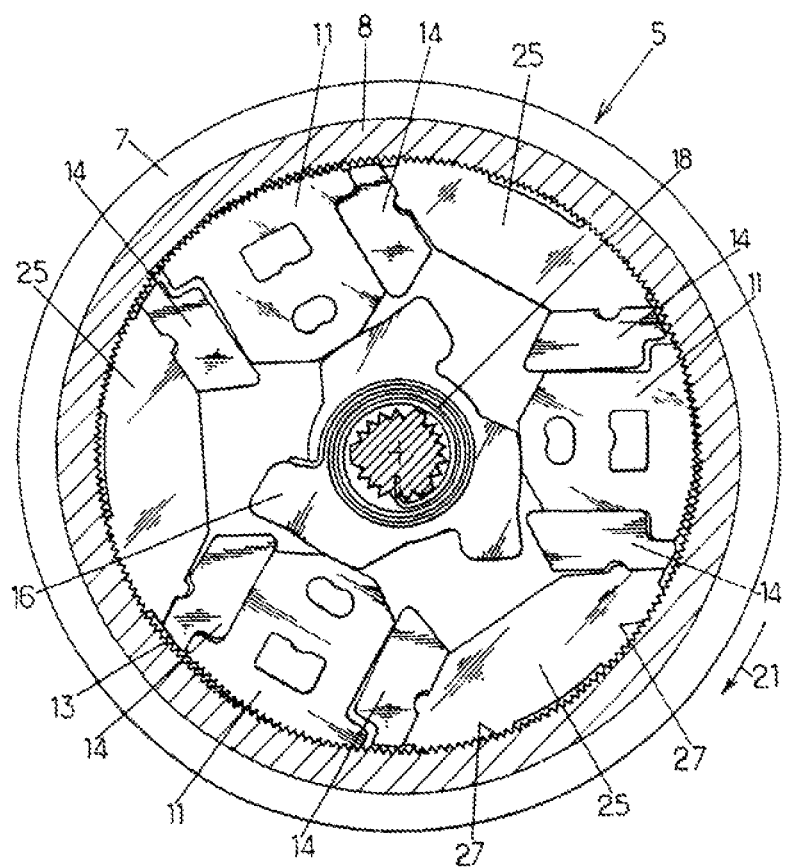
FIG. 3 is a schematic view showing a rotating mechanism of the seat angle adjustment device shown in FIG. 2 of a vehicle after an accident.

| Reference numerals in FIGS. 4 to 18: | |
|---|---|
| 10 ratchet wheel, | 11 first projection part, |
| 12 central hole, | 13 outer periphery surface, |
| 14 step, | 15 toothed part, |
| 17 first step, | 18 second step; |
| 20 unlocking cam, | 21 first unlocking contour surface, |
| 22 second unlocking contour surface, | 23 hole, |
| 24 inner square hole, | 25 first special-shaped groove, |
| 26 second special-shaped groove; | |
| 30 locking cam, | 31 protrusion, |
| 32 inner square hole, | 33, 34 first locking contour surface, |
| 35 second locking contour surface, | 36, 37 protruding parts, |
| 38 protruding part; | |
| 40 pawl, | 41 side surface, |
| 42 self-locking surface, | 43 toothed part, |
| 45 boss, | 47 protruding part; |
| 50 locking slider, | 51, 52 self-locking surfaces, |
| 53 side edge, | 54 toothed part, |
| 55 boss, | 57, 58 protruding parts; |
| 60 shaft, | 61 outer square mating surface, |
| 63 circular shaft shoulder, | 64 circular shaft shoulder, |
| 65 central square hole; | |

-continued

| Reference numerals in FIGS. 4 to 18: | |
|---|---|
| 70 spiral spring, | 71 inner side fixed end, |
| 72 torque bearing end; | |
| 80 stop plate, | 81 inner wall, |
| 82 counter bore, | 83 central hole, |
| 84 outer periphery surface, | 85 first stopping and position-limiting part, |
| 86 side surface, | 87 second stopping and position-limiting part, |
| 88 side surface, | 89 side surface, |
| 810 inwardly concaved receiving part, | 811 second projection part; |
| 90 jacket, | 91 inner wall, |
| 92 inner end surface, and | 93 inner wall. |

DETAILED DESCRIPTION

The technical solutions in the embodiments of the present application will be described clearly and completely hereinafter in conjunction with the drawings in the embodiments of the present application. Apparently, the described embodiments are only a part of the embodiments of the present application, rather than all embodiments. Based on the embodiments in the present application, all of other embodiments, made by the person skilled in the art without any creative efforts, fall into the protection scope of the present application.

An object of the present application is to provide a seat angle adjustment device with an optimized structure, which can effectively control the product manufacturing cost on the basis of ensuring great overall strength and energy absorption performance. Embodiments will be described in detail hereinafter in conjunction with the drawings.

Figure 4:
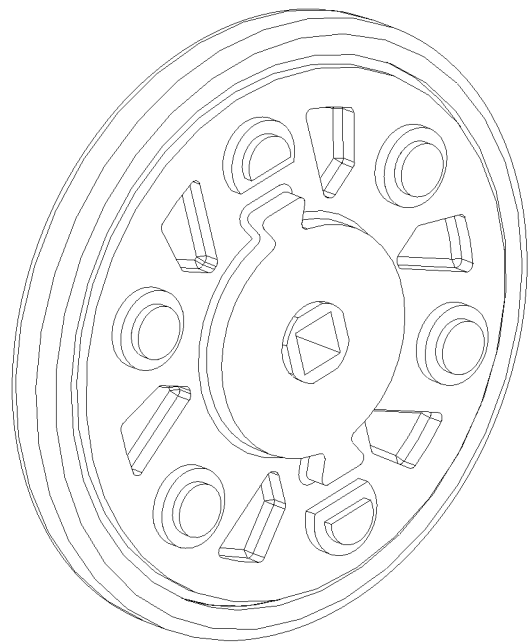
FIGS. 4 and 5 are isometric schematic views of the seat angle adjustment device according to an embodiment seen from two angles respectively.
Figure 5:
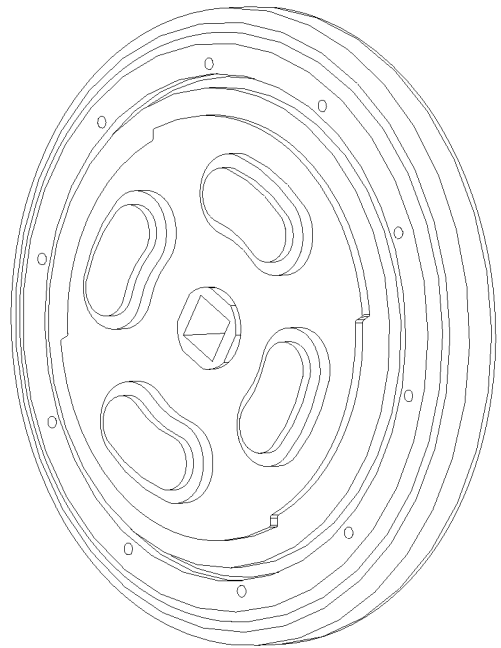
Figure 6:
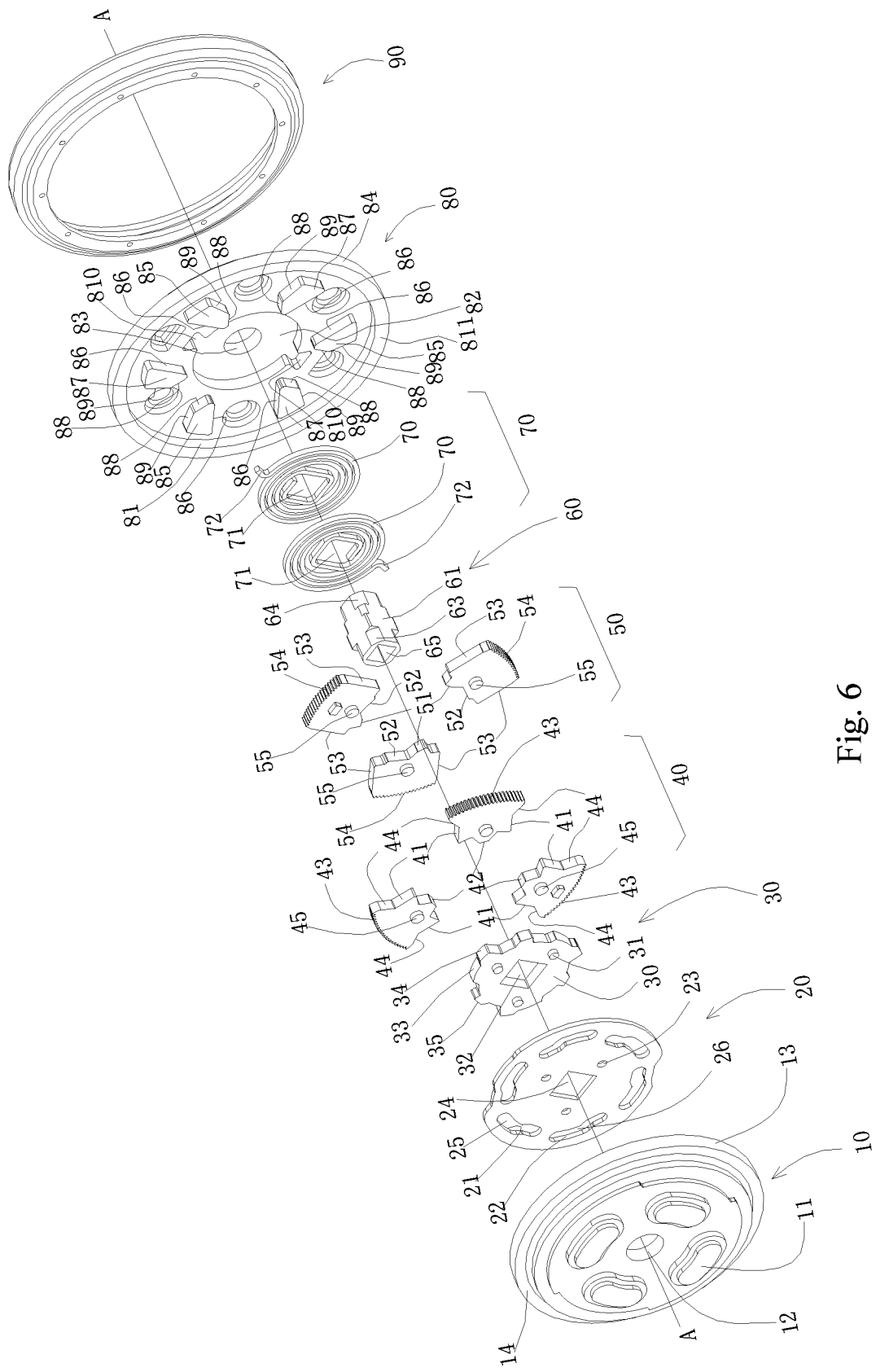
FIG. 6 is an exploded schematic view showing the assembly of the seat angle adjustment device according to the embodiment.

Reference is made to FIGS. 4, 5 and 6. FIGS. 4 and 5 are isometric schematic views of the seat angle adjustment devices according to this embodiment seen from two angles respectively; and FIG. 6 is an exploded schematic view showing the assembly of the seat angle adjustment device according to this embodiment.

As shown in the Figures, the seat angle adjustment device includes a ratchet wheel 10 and a stop plate 80 which are rotatable coaxially; and when the seat angle adjustment device is assembled with a seat, one of the ratchet wheel 10 and the stop plate 80 is fixed to a seat base, and the other one thereof is fixed to the seat back.

Figure 7:
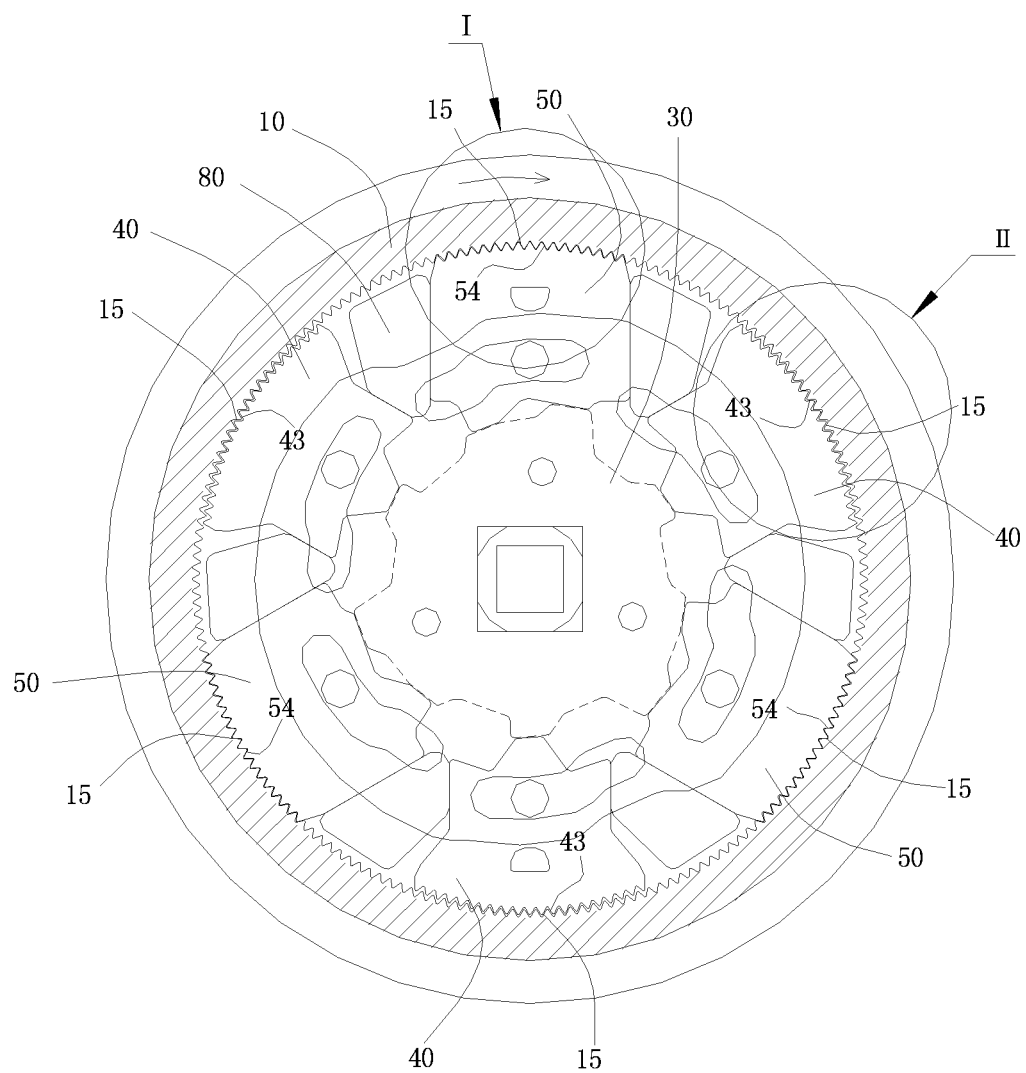
FIG. 7 is a schematic view showing position relationships among components of the seat angle adjustment device of FIG. 6 in a locked state.
Figure 8:
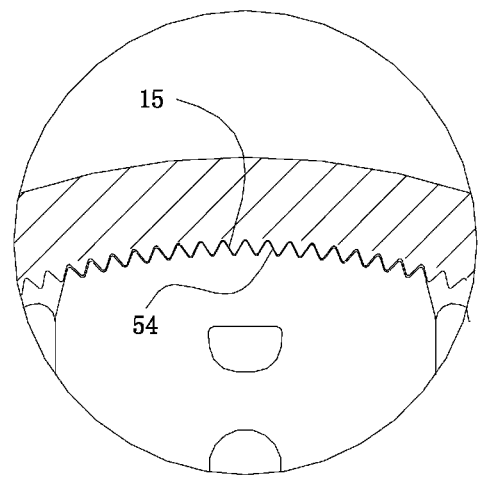
FIG. 8 is an enlarged view of portion I of FIG. 7.
Figure 10:
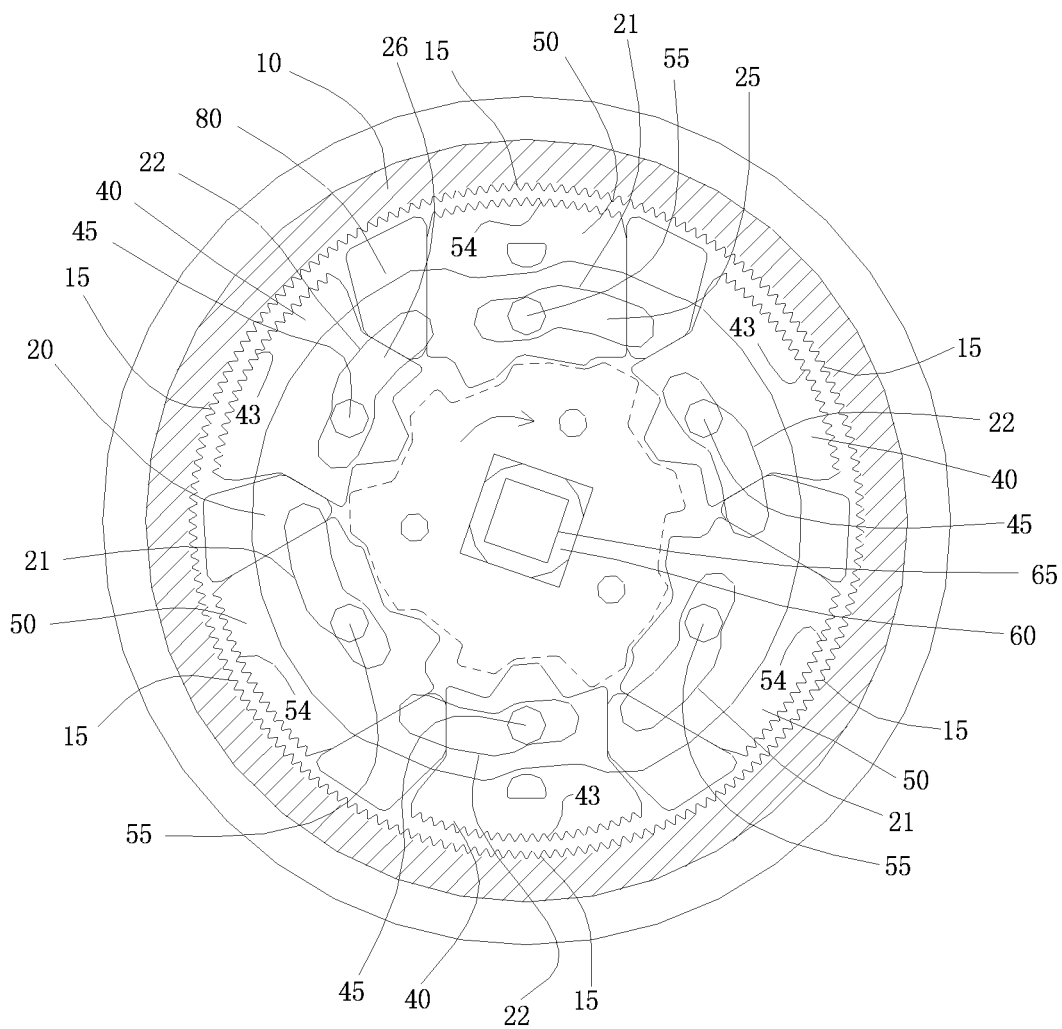
FIG. 10 is a schematic view showing position relationships among the components of the seat angle adjustment device of FIG. 6 in an unlocked state.

Three locking sliders 50 are radially movable between a locked position and a retracted position with respect to the ratchet wheel 10. Reference is made to FIGS. 7, 8 and 10. FIG. 7 shows position relationships among components in a locked state, FIG. 8 is an enlarged view of portion I of FIG. 7, and FIG. 10 shows position relationships among components in an unlocked state.

As shown in FIGS. 7 and 8, in the locked position, a toothed part of the locking slider 50 is engaged with a toothed part of the ratchet wheel 10, and a circumferential relative position of the ratchet wheel 10 and the stop plate 50 is fixed, i.e., a working angle of the seat back is locked. As shown in FIG. 10, in the retracted position, the toothed part 54 of the locking slider 50 is disengaged from the toothed part 15 of the ratchet wheel 10, i.e., the working angle of the seat back is adjustable. The switching of the locking sliders 50 between the locked position and the retracted position can be achieved by a driving device.

Figure 9:
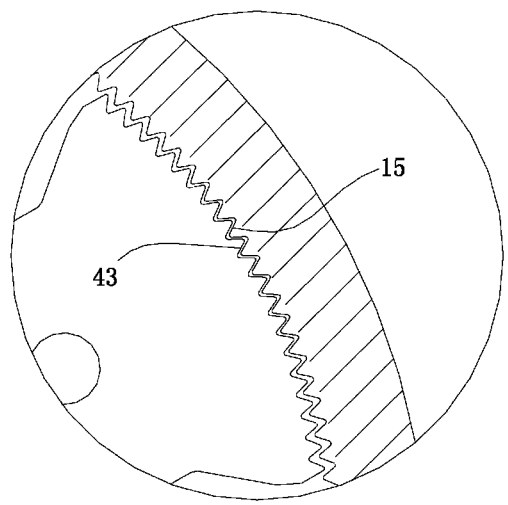
FIG. 9 is an enlarged view of portion II of FIG. 7.

Three pawls 40 are radially movable between an extended position and a retracted position with respect to the ratchet wheel 10. Reference is made to FIG. 9, which is an enlarged view of portion II of FIG. 7. In the extended position, a toothed part 43 of the pawl 40 is semi-engaged with the toothed part 15 of the ratchet wheel 10, and in the retracted position, the toothed part 43 of the pawl 40 is disengaged from the toothed part 15 of the ratchet wheel 10. Similarly, the switching of the pawl 40 between the extended position and the retracted position can also be achieved by a driving device.

A first stopping and position-limiting part 85 and a second stopping and position-limiting part 87 are arranged on the stop plate 80, and are arranged alternately with the locking slider 50 and the pawl 40 in sequence in a circumferential direction, respectively. A number of the first stopping and position-limiting part 85 and a number of the second stopping and position-limiting part 87, respectively, correspond to a number of the locking sliders 50 and a number of the pawls 40, and are both three. The first stopping and position-limiting part 85 is located at a downstream side of a rotating direction (the clockwise direction indicated by an arrow in FIG. 7) of the locking slider 50, and the second stopping and position-limiting part 87 is located at a downstream side of a rotating direction of the pawl 40. As shown in the Figures, when subjected to a rotational torque in the rotating direction, the locking slider 50 in the locked position abuts against the first stopping and position-limiting part 85 circumferentially, so as to generate a rigid impact between the locking slider 50 and the first stopping and position-limiting part 85 as the rotation torque continues to increase, thereby improving comfort for passengers.

When the rotational torque is greater than a first preset torque value, the first stopping and position-limiting part 85 is configured to be able to generate a circumferential deformation under the action of the locking slider 50, and the pawl 40 in the extended state is configured to be able to rotate, driven by the ratchet wheel 10, until a toothed part at one side of the pawl 40 is fully engaged with the ratchet wheel 10.

Figure 11:
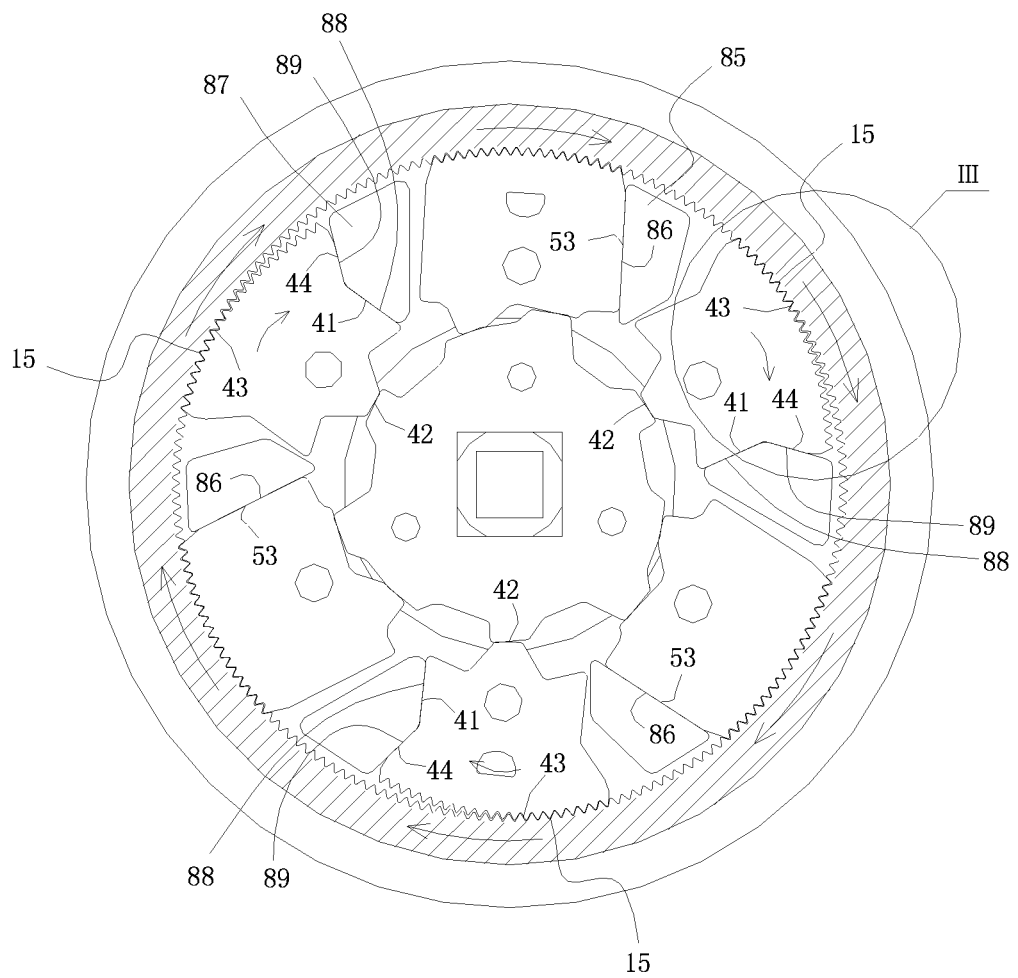
FIG. 11 shows position relationships among the components after a seat back was subjected to a large impact.
Figure 12:
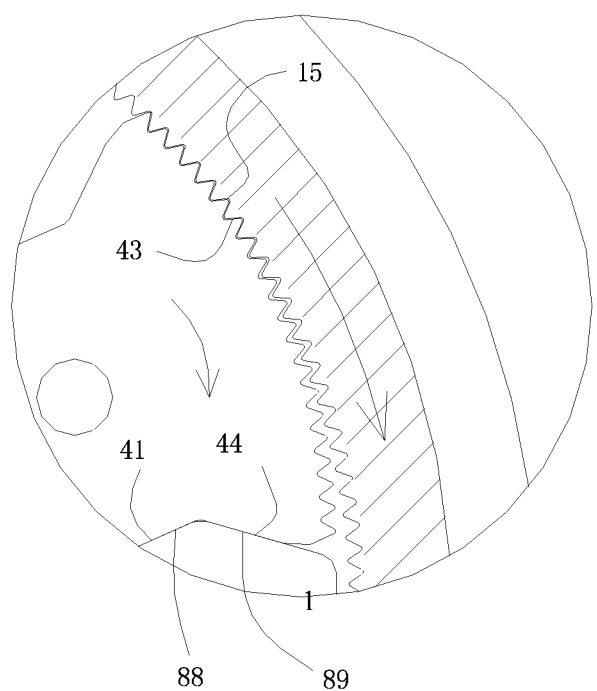
FIG. 12 is an enlarged view of portion III of FIG. 11.

When the rotational torque is greater than a second preset torque value, the second stopping and position-limiting part 87 is configured to be able to abut against the pawl 40, and the second preset torque value is greater than the first preset torque value, thereby forming a two-level strength. The circumferential deformation is preferably a plastic deformation so as to improve the use safety to the greatest extent. Reference is made to FIGS. 11 and 11. FIG. 11 shows position relationships among the components after the seat back was subjected to a large impact, and FIG. 12 is an enlarged view of portion III of FIG. 11. It is to be noted that, the first preset torque value and the second preset torque value can be preset according to a strength requirement, and can be determined by the person skilled in the art through strength calculation according to different bearing requirements and specific structures.

It should be understood that, in this solution, there may be one pawl 40 and one locking slider 50, or may be a plurality of pawls 40 and a plurality of locking sliders 50 which are both uniformly distributed along the circumferential direction, and all of which fall within the scope claimed by the present application as long as the using requirement can be met. Apparently, the plurality of pawls 40 and locking sliders 50 uniformly distributed along the circumferential direction may balance an eccentric load of each component during the movement, thus is the most preferred embodiment.

Figure 13:
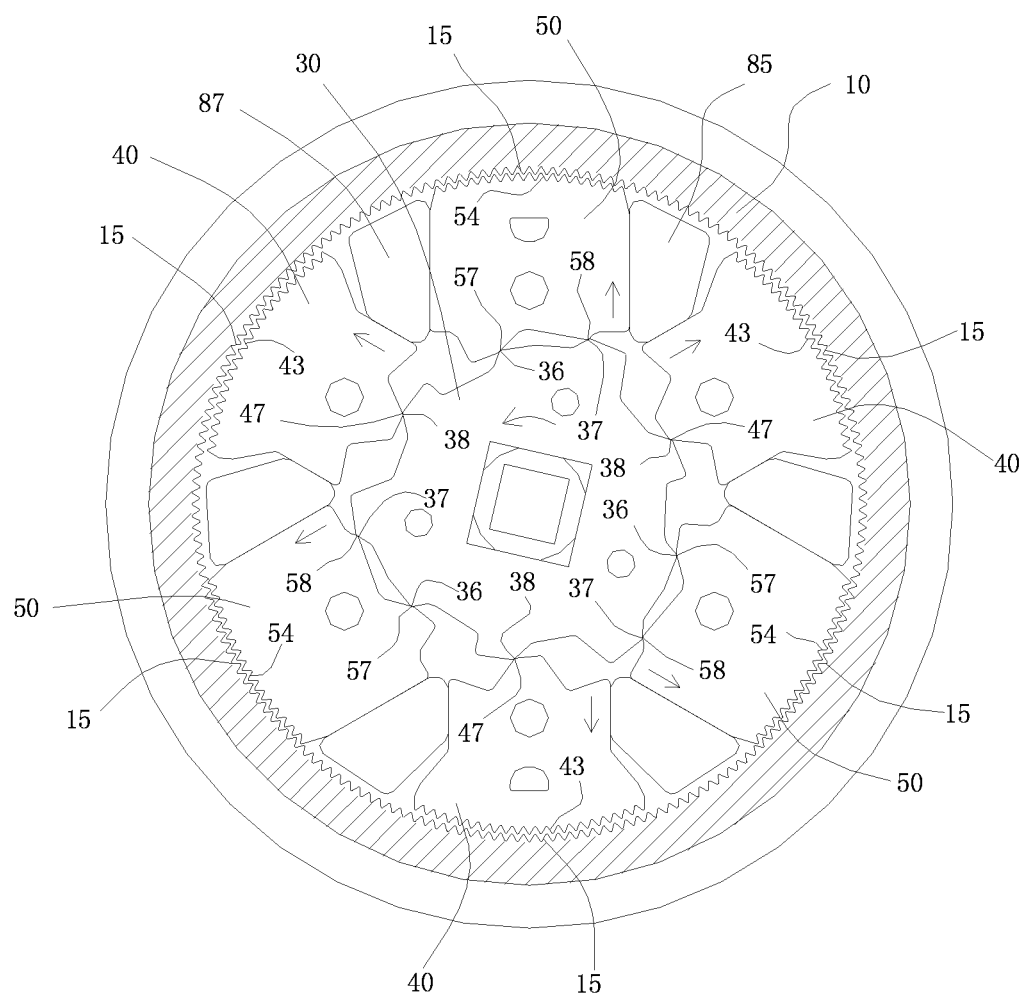
FIG. 13 shows a movement tendency among a driving device, a locking slider and a pawl during a process of switching from the unlocked position to the locked position.

The driving device, used to drive the pawl 40 and the locking slider 50 to switch positions, may also be implemented by various structures. In this solution, the driving device mainly includes a locking cam 30 and an unlocking cam 20 cooperating with each other and rotatable coaxially. The locking cam 30 has a first locking contour surface 33, 34 and a second locking contour surface 35. Reference is made to FIG. 13, which shows a movement tendency during a process of switching from the unlocked position to the locked position.

As shown in FIG. 13, the first locking contour surface 33, 34 (which consists of two contour surfaces spaced apart circumferentially) is configured to be rotatable in the first rotational direction (which is the counter-clockwise direction indicated by an arrow in FIG. 13), and to drive the locking slider 50 to move radially to the locked position, and the locking slider 50 in the locked position abuts against the first locking contour surface 33, 34 at self-locking points. The second locking contour surface 35 is configured to be rotatable in the second rotational direction, and to drive the pawl 40 to move radially to the extended position, and the pawl 40 at the extended position is configured to be able to rotate, driven by the ratchet wheel 10, around a self-locking point between the pawl 40 and the second locking contour surface 35 until the toothed part at one side of the pawl 40 is completely engaged with the ratchet wheel 10.

As shown in FIG. 10, the unlocking cam 20 has a first unlocking contour surface 21 and a second unlocking contour surface 22. The first unlocking contour surface 21 is configured to be rotatable in the second rotational direction, and to drive the locking slider 50 to move radially to the retracted position. The second locking contour surface 22 is configured to be rotatable in the second rotational direction, and to drive the pawl 40 to move radially to the retracted position.

In order to achieve the coaxial rotation of the locking cam 30 and the unlocking cam 20, the locking cam 30 and the unlocking cam 20 may be formed integrally with a rotating shaft, or arranged to be detachably connected to the shaft 60. As shown in FIG. 6, the shaft 60 is provided as a hollow shaft to reduce the total weight. The locking cam 30 is provided with an inner square hole 32, the unlocking cam 20 is provided with an inner square hole 24, an outer periphery surface of the shaft 60 is provided with an outer square mating surface 61 matching with the inner square hole 32 and the inner square hole 24, and the locking cam 30, the unlocking cam 20 and the shaft 60 can rotate coaxially after being assembled. Further, the locking cam 30 is provided with three protrusions 31, the unlocking cam 20 is provided with three holes 23, and the protrusions 31 and the holes 23 form a shaft-hole cooperation, which further improves the reliability of the coaxial rotation of the locking cam 30 and the unlocking cam 20. Furthermore, two ends of the shaft 60 are respectively provided with a circular shaft shoulder 63 and a circular shaft shoulder 64 at four corners, the circular shaft shoulder 63 cooperates with a central hole 12 of the ratchet wheel 10 and is rotatable with respect to the central hole 12, and the circular shaft shoulder 64 cooperates with a central hole 83 of the stop plate 80 and is rotatable with respect to the central hole 83.

To facilitate operation of passengers, the seat angle adjuster is required to be automatically reset to the locked position after an unlocking operation. In this solution, a precompressed elastic returning member is arranged between the shaft 60 and the stop plate 80, and may generate a tendency for driving the shaft 60 to rotate in the first rotational direction. While unlocking, the elastic returning member is inevitably further compressed, thus after the unlocking operation, the elastic deformation of the elastic returning member can be released to push the shaft 60 to rotate in the first rotational direction, which in turn drives the locking slider 50 to move radially to the locked position via the locking cam 30.

Further, there are two elastic returning members arranged symmetrically in a radial direction with respect to a rotation center. The rotation center herein refers to an axis of the shaft 60. In this solution, the elastic returning member is a spiral spring 70 mounted on the shaft 60. Inner side fixed ends 71 of two spiral springs 70 are configured to be rotatable coaxially with the shaft 60, and outer side torque bearing ends 72 of the two spiral springs 70 are symmetrically arranged in a radial direction and rotatable coaxially with the stop plate 80.

Figure 14:
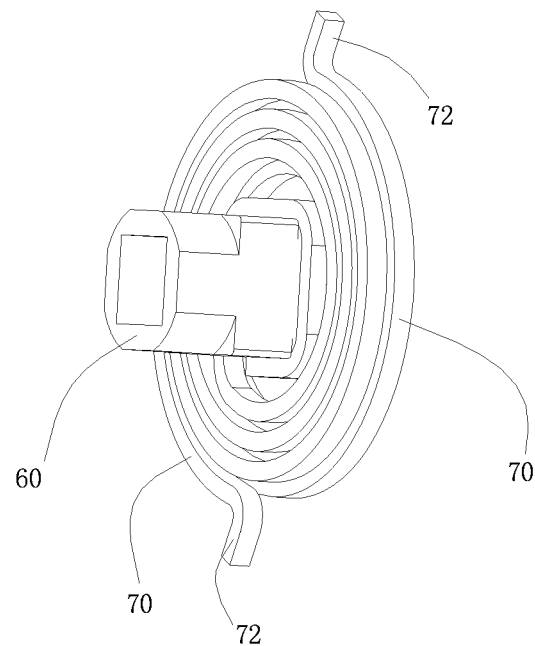
FIG. 14 is a schematic view showing the assembly between two spiral springs and a shaft.

Apparently, the connection of each of the inner side fixed end 71 and the torque bearing end 72 of the spiral spring 70 can be realized by various forms, such as welding, riveting, bonding or other known techniques. In this solution, the inner side fixed end 71 of the spiral spring 70 is wound into a square shape matching with the outer square mating surface 61 of the shaft 60. Reference is made to FIG. 14, which is a schematic view showing the assembly between two spiral springs and the shaft. Further, a central portion of the stop plate 80 is provided with a counter bore 82 for receiving the two spiral springs 70, and the stop plate 80 is provided with two inwardly concaved receiving parts 810 which are arranged symmetrically with respect to the rotation center in the radial direction. After protruding radially, the torque bearing ends 72 of the two spiral springs 70 are placed inside corresponding inwardly concaved receiving parts 810 to rotate coaxially with the stop plate 80.

Further, the first unlocking contour surface 21 is an outer side groove wall of a first special-shaped groove 25 arranged on the unlocking cam 20 circumferentially, and the second unlocking contour surface 22 is an outer side groove wall of a second special-shaped groove 26 arranged on the unlocking cam 20 circumferentially. The locking slider 50 has a boss 55 extending axially and configured to be inserted into the first special-shaped groove 25, the pawl 40 has a boss 45 extending axially and configured to be inserted into the second special-shaped groove 26, and each of the bosses abuts against the outer side groove wall of the corresponding special-shaped groove in the radial direction.

In order to improve the reliability of the movement of the locking slider 50, side surfaces 86, for cooperating with the locking slider 50, of the first stopping and position-limiting part 85 and the second stopping and position-limiting part 87 are parallel to each other and arranged symmetrically with respect to the rotation center, so as to have guiding and position-limiting functions. Similarly, side surfaces 88, for cooperating with a side of the pawl 40 near the rotation center, of the first stopping and position-limiting part 85 and the second stopping and position-limiting part 87 are parallel to each other and arranged symmetrically with respect to the rotation center.

Further, a side surface 89 for cooperating with the pawl 40, which is away from the rotation center, of the second stopping and position-limiting part 87 is configured to abut against the pawl 40 when the rotational torque is greater than the second preset torque value, so as to further increase the bearing capacity of the second stopping and position-limiting part 87.

In addition, the ratchet wheel 10 has a first projection part 11 extending outwards axially for connecting to the backrest (or the seat base) of the seat. The stop plate 80 has a second projection part 811 extending outwards axially for connecting to the seat base (or the backrest) of the seat.

Figure 15:
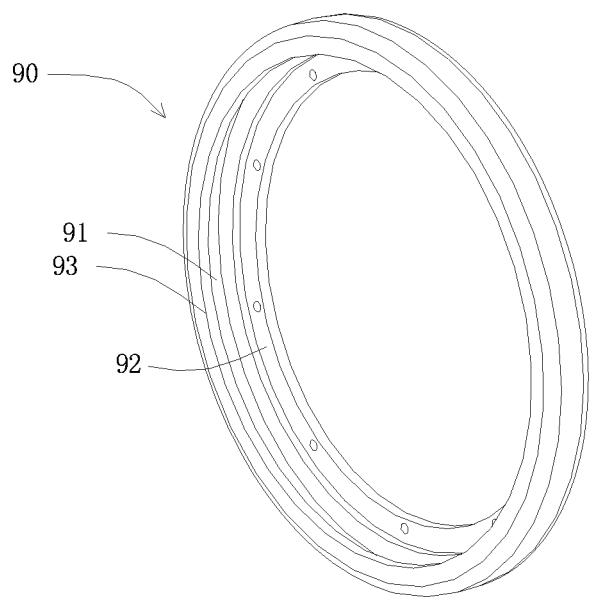
FIG. 15 is an isometric schematic view of a jacket.

In this solution, a jacket 90 is mounted outside the seat angle adjustment device to house all the parts as a whole. Reference is made to FIG. 15, which is an isometric schematic view of the jacket.

After the assembly is completed, the jacket 90 can be fastened to the stop plate 80 by riveting. A clearance fit is formed between an inner wall 91 of the jacket 90 and an outer periphery surface 13 of the ratchet wheel 10, a clearance fit is formed between an inner wall 93 of the jacket 90 and an outer periphery surface 84 of the stop plate 80, and a clearance fit is formed between an inner end surface 92 of the jacket 90 and a step 14 of the ratchet wheel 10, thus the ratchet wheel 10 is rotatable around the axis with respect to the stop plate 80.

Figure 16:
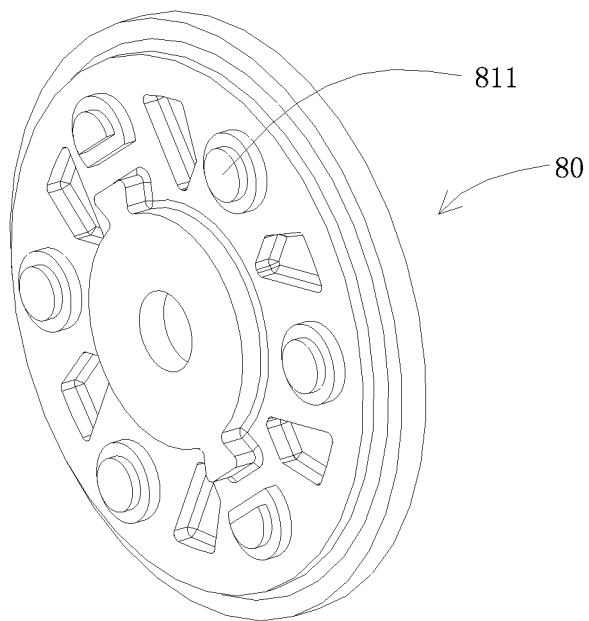
FIG. 16 is an isometric schematic view of a stop plate.
Figure 17:
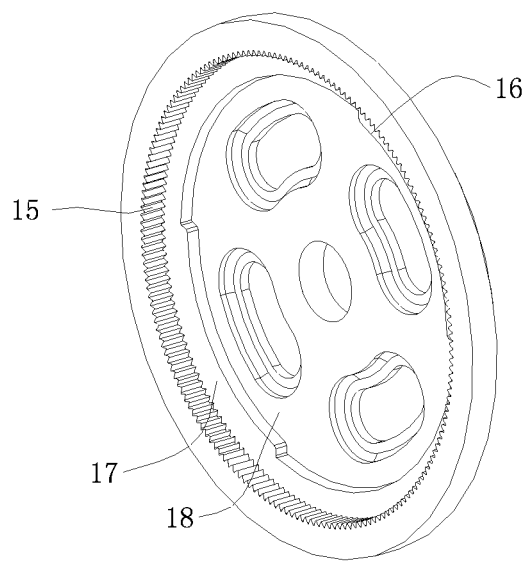
FIG. 17 is an isometric schematic view of a ratchet wheel.

The outer periphery surface 13 of the ratchet wheel 10 cooperates with the inner wall 81 of the stop plate 80, and the ratchet wheel 10 and the stop plate 80 are rotatable with respect to each other. The slider 50, the pawl 40 and the locking cam 30 are placed in a first step 17 of the ratchet wheel 10, and the unlocking cam 20 is placed in a second step 18 of the ratchet wheel 10. Reference is made to FIGS. 16 and 17, FIG. 16 is an isometric schematic view of the stop plate, and FIG. 17 is an isometric schematic view of the ratchet wheel.

On the basis of the seat angle adjustment device described above, this embodiment further provides a seat including a seat back and a seat base hinged together, and a seat angle adjustment device connected between the seat back and the seat base. The structure of the seat itself is not the key point of the present application, which will not be described in detail herein.

The operating principle of the seat angle adjustment device will be described briefly hereinafter.

Figure 18:
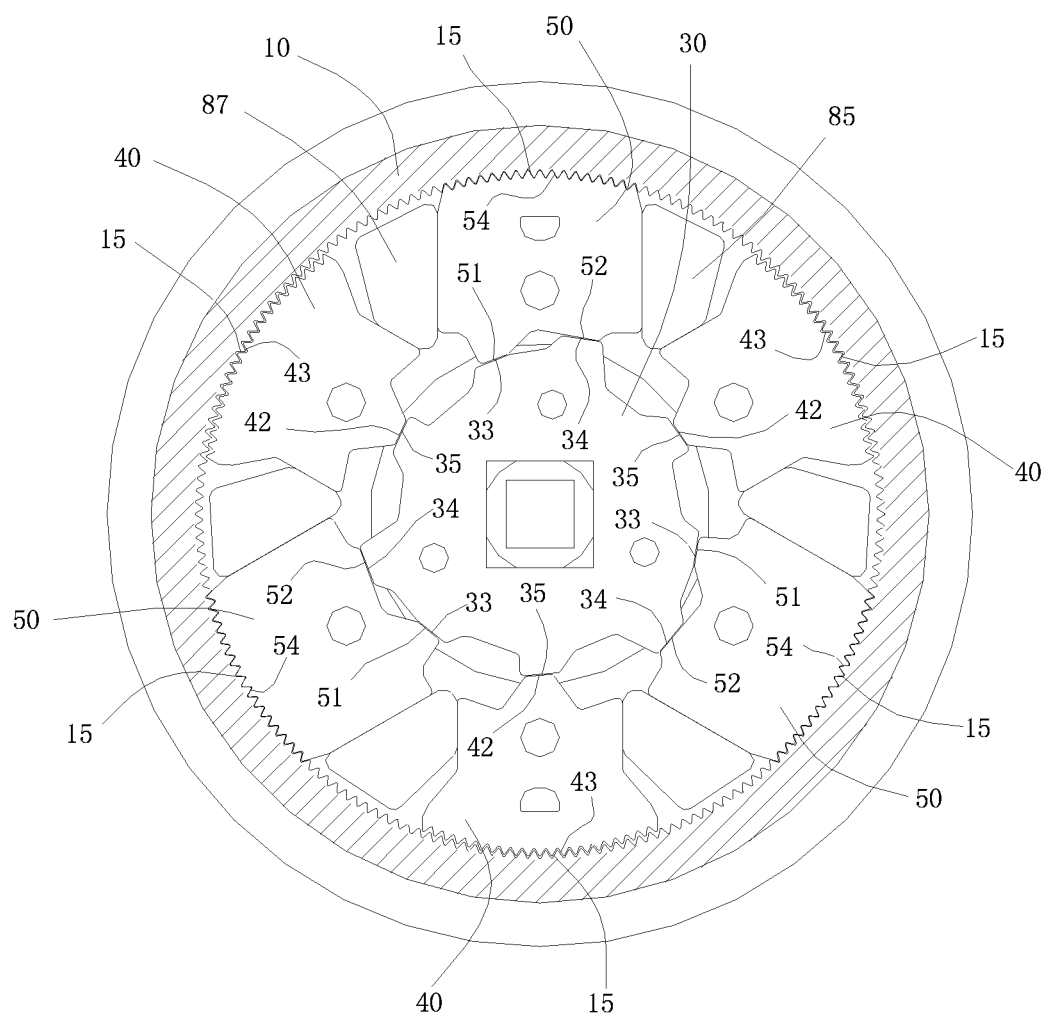
FIG. 18 is a view showing a cooperative relationship among the components in the locked state, which is formed on the basis of FIG. 7 with an unlocking cam being removed.

Firstly, in the locked state:

When the seat back is in the normal locked state, the cooperation relationships among the components of the seat angle adjustment device are shown in FIG. 18. Six first locking contour surfaces 33, 34 of the locking cam 30 respectively abut against two self-locking surfaces 51, 52 of three sliders 50 to form self-locks. The inner side fixed ends 71 of the two spiral springs 70 are connected to the outer square mating surface 61 of the shaft 60, and at the same time, the outer square mating surface 61 of the shaft 60 is also connected to the inner square hole 32 of the locking cam 30. And the pre-compressed acting forces of the two spiral springs 70 always provide a tendency for driving the locking cam 30 to rotate in the first rotational direction (i.e. the counter-clockwise locking direction). In this state, the toothed part 54 of the locking slider 50 is fully engaged with the toothed part 15 of the ratchet wheel 10. The locking slider 50 abuts against the first stopping and position-limiting part at the downstream side circumferentially, thus the ratchet wheel 10 can not rotate with respect to the stop plate 80, such that the seat back is in a reliable locked state.

In this state, three second locking contour surfaces 35 of the locking cam 30 respectively abut against self-locking surfaces 42 of three pawls 40 to form self-locks. The toothed part 43 of the pawl 40 and the toothed part of the ratchet wheel 14 are not fully engaged, i.e., in a semi-engaged state with a certain clearance. As shown in FIG. 9, the clearance increases gradually from the middle part to two sides of the toothed part 43, thus when the pawl 40 rotates around its self-locking point, two side ends thereof may have enough swing spaces, thus the pawl 40 may have a better movement performance.

Secondly, in the unlocking process:

As shown in FIG. 10, when unlocking the seat angle adjustment device, an external force drives the shaft 60, through a central square hole 65 of the shaft 60, to overcome the torques of the two spiral springs 70 to rotate in the first rotational direction (i.e. the clockwise unlocking direction). Since the outer square mating surface 61 of the shaft 60 is connected to the inner square hole 24 of the unlocking cam 20, the unlocking cam 20 also rotates in the clockwise direction. The outer side groove walls of three first special-shaped grooves 25 of the unlocking cam 20 abut against the bosses 55 of three locking sliders 50, and the outer side groove walls of three second special-shaped grooves 26 of the unlocking cam 20 abut against the bosses 45 of three pawls 40, thus during the rotating process, the locking sliders 50 and the pawls 40 are driven to slide radially toward the center between the first stopping and position-limiting part 85 and the second stopping and position-limiting part 87 of the stop plate 80 until the toothed parts 54 of the locking sliders 50 and the toothed parts 43 of the pawls 40 are disengaged from the toothed part 15 of the ratchet wheel 10. In this state, the device is unlocked, and the ratchet wheel 10 is rotatable with respect to the stop plate 80, thereby realizing the backrest adjustment function.

Thirdly, returning to the locked state after the unlocking process:

When the external force is released, as shown in FIG. 13, the two spiral springs 70 drive the locking cam 30 via the outer square mating surface 61 of the shaft 60 to rotate in the second rotational direction (i.e. the counter-clockwise locking direction), and protruding parts 36, 37 of the locking cam 30 respectively come into contact with protruding parts 57, 58 of the locking slider 50, thus the locking slider 50 is driven to move away from the rotation center along the side surface 86 between the first stopping and position-limiting part 85 and the second stopping and position-limiting part 87 of the stop plate 80, and is always affected by two supporting points at the same time until the toothed part 54 of the locking slider 50 is engaged with the toothed part 15 of the ratchet wheel 10, thereby ensuring that the locking slider 50 is not easy to incline. Meanwhile, a protruding part 38 of the locking cam 30 comes into contact with a protruding part 47 of the pawl 40, thus a side surface 41 of the pawl 40 is driven to move away from the rotation center along the side surface 88 between the first stopping and position-limiting part 85 and the second stopping and position-limiting part 87 of the stop plate 80 until the toothed part 43 of the pawl 40 and the toothed part 15 of the ratchet wheel 10 are semi-engaged, i.e., are not fully engaged as shown by the state in FIG. 18, and the seat angle adjustment device is in the locked state. In this state, the ratchet wheel 10 can not rotate with respect to the stop plate 80, thereby realizing the locking process of the seat back.

Fourthly, the deformation process of the device under load:

As shown in FIG. 18, the adjustment device is in the normal locked state. When the seat back is subjected to a relatively large load or impact, the ratchet wheel 10 drives the locking slider 50 to rotate in the forced direction. As shown in FIG. 11, the first stopping and position-limiting part 85 at the downstream side of the locking slider 50 is pressed by a side edge 53 of the locking slider 50 to be deformed, and meanwhile, the ratchet wheel 10 rotates in the forced direction with respect to the stop plate 80. And then the toothed part 15 of the ratchet wheel 80 drives the pawl 40 to rotate around the self-locking point at the self-locking surface 42 until the toothed part 43 on one side of the pawl 40 is fully engaged with the toothed part 15 of the ratchet wheel 10, and meanwhile, the other side edge 44 of the pawl 40 abuts against the side edge 89 of the stop plate 80, and at this time, the strength of the pawl 40 of the adjusting device functions, which further improve the strength of the device. In this process, it is under the first-level strength in the initial stage of the locking slider 50 subjected to a force, and it is under the second-level strength after the pawl 40 is engaged, and finally, the locking slider 50 and the pawl 40 are working at the same time.

It should be noted that, the first rotational direction and the second rotational direction in this solution are only used for the expression of cooperation relationships among the components, and are not limited to the directions indicated by the arrows in Figures, that is, the first rotational direction is a clockwise direction, and the second rotational direction is a counter-clockwise direction.

The above description is only preferred embodiments of the present application. It should be noted that, for the person skilled in the art, many modifications and improvements may be made to the present application without departing from the principle of the present application, and these modifications and improvements are also deemed to fall into the protection scope of the present application.

The invention claimed is:

1. A seat angle adjustment device, comprising:
a ratchet wheel and a stop plate rotatable coaxially; and
at least one locking slider configured to be movable radially with respect to the ratchet wheel between a locked position and a retracted position, wherein, at the locked position, a toothed part of the locking slider is engaged with a toothed part of the ratchet wheel, and a circumferential relative position between the ratchet wheel and the stop plate is fixed, and at the retracted position, the toothed part of the locking slider is disengaged from the toothed part of the ratchet; wherein the seat angle adjustment device further comprises:
at least one pawl configured to be movable radially with respect to the ratchet wheel between an extended position and a retracted position, wherein at the extended position, a toothed part of the pawl is semi-engaged with the toothed part of the ratchet wheel, and at the retracted position, the toothed part of the pawl is disengaged from the toothed part of the ratchet wheel; and
a driving device configured to selectively drive the locking slider to be at the locked position or the retracted position, and to selectively drive the pawl to be at the extended position or the retracted position; and wherein,
a first stopping and position-limiting part and a second stopping and position-limiting part are arranged on the stop plate and are respectively located at a downstream side of a rotational direction of the locking slider and a downstream side of a rotational direction of the pawl; and the first stopping and position-limiting part is configured to abut against the locking slider at the locked position circumferentially in a case that the locking slider is subjected to a rotational torque in the rotational direction;
in a case that the rotational torque is greater than a first preset torque value, the first stopping and position-limiting part is configured to generate a circumferential deformation under the action of the locking slider, and the pawl at the extended position is configured to be driven by the ratchet wheel to rotate until a toothed part at one side of the pawl is fully engaged with the ratchet wheel; and
in a case that the rotational torque is greater than a second preset torque value, the second stopping and position-limiting part is configured to abut against the pawl, and the second preset torque value is greater than the first preset torque value;
wherein the circumferential deformation is a plastic deformation and the driving device comprises a locking cam and an unlocking cam rotatable coaxially, wherein,
the locking cam comprises a first locking contour surface and a second locking contour surface, the first locking contour surface is configured to be rotatable in a first rotational direction and drive the locking slider to move radially to the locked position, and the locking slider at the locked position abuts against the first locking contour surface at a self-locking point, the second locking contour surface is configured to be rotatable in the first rotational direction and drive the pawl to move radially to the extended position, and the pawl at the extended position is configured to be driven by the ratchet wheel to rotate around a self-locking point between the pawl and the second locking contour surface until the toothed part on one side of the pawl is fully engaged with the ratchet wheel; and
the unlocking cam comprises a first unlocking contour surface and a second unlocking contour surface, the first unlocking contour surface is configured to be rotatable in a second rotational direction and drive the locking slider to move radially to the retracted position, and the second unlocking contour surface is configured to be rotatable in the second rotational direction and drive the pawl to move radially to the retracted position.

2. The seat angle adjustment device according to claim 1, wherein the first locking contour surface consists of two contour surfaces spaced apart circumferentially.

3. The seat angle adjustment device according to claim 2, wherein the driving device further comprises a shaft rotatable coaxially with the locking cam and the unlocking cam, and an elastic returning member pre-compressed and arranged between the shaft and the stop plate, and the elastic returning member is configured to generate a tendency for driving the shaft to rotate in the first rotational direction after being pre-compressed.

4. The seat angle adjustment device according to claim 3, wherein there are two elastic returning members symmetrically arranged with respect to a rotation center in a radial direction.

5. The seat angle adjustment device according to claim 4, wherein the elastic returning members are spiral springs mounted on the shaft, inner side fixed ends of two spiral springs are configured to be rotatable coaxially with the shaft, and outer side torque bearing ends of the two spiral springs are symmetrically arranged in the radial direction and rotatable coaxially with the stop plate.

6. The seat angle adjustment device according to claim 5, wherein each of the first unlocking contour surface and the second unlocking contour surface is an outer side groove wall of a special-shaped groove arranged on the unlocking cam circumferentially; and each of the locking slider and the pawl has a boss extending axially and inserted into the corresponding special-shaped groove, and each boss abuts against the outer side groove wall of the corresponding special-shaped groove in the radial direction.

7. The seat angle adjustment device according to claim 6, wherein a number of each of the locking slider, the first stopping and position-limiting part, the pawl and the second stopping and position-limiting part is three, and the three locking sliders, and the three first stopping and position-limiting parts, the three pawls and the three second stopping and position-limiting parts are arranged in sequence at intervals circumferentially; side surfaces, for cooperating with the locking slider, of the first stopping and position-limiting part and the second stopping and position-limiting part are parallel to each other and arranged symmetrically with respect to the rotation center.

8. The seat angle adjustment device according to claim 7, wherein side surfaces, for cooperating with a side of the pawl near the rotation center, of the first stopping and position-limiting part and the second stopping and position-limiting part are parallel to each other and arranged symmetrically with respect to the rotation center; and a side surface, for cooperating with a side of the pawl away from the rotation center, of the second stopping and position-limiting part is configured to abut against the pawl in a case that the rotational torque is greater than the second preset torque value.

9. The seat angle adjustment device according to claim 8, wherein the ratchet wheel has a first projection part extending outwards axially, and the stop plate has a second projection part extending outwards axially; and the first projection part and the second projection part are configured to be respectively connected to a seat back and a seat base which are hinged together, or to the seat base and the seat back which are hinged together.

10. The seat angle adjustment device according to claim 1, wherein the driving device further comprises a shaft rotatable coaxially with the locking cam and the unlocking cam, and an elastic returning member pre-compressed and arranged between the shaft and the stop plate, and the elastic returning member is configured to generate a tendency for driving the shaft to rotate in the first rotational direction after being pre-compressed.

11. The seat angle adjustment device according to claim 10, wherein there are two elastic returning members symmetrically arranged with respect to a rotation center in a radial direction.

12. The seat angle adjustment device according to claim 11, wherein the elastic returning members are spiral springs mounted on the shaft, inner side fixed ends of two spiral springs are configured to be rotatable coaxially with the shaft, and outer side torque bearing ends of the two spiral springs are symmetrically arranged in the radial direction and rotatable coaxially with the stop plate.

13. The seat angle adjustment device according to claim 12, wherein each of the first unlocking contour surface and the second unlocking contour surface is an outer side groove wall of a special-shaped groove arranged on the unlocking cam circumferentially; and each of the locking slider and the pawl has a boss extending axially and inserted into the corresponding special-shaped groove, and each boss abuts against the outer side groove wall of the corresponding special-shaped groove in the radial direction.

14. The seat angle adjustment device according to claim 13, wherein a number of each of the locking slider, the first stopping and position-limiting part, the pawl and the second stopping and position-limiting part is three, and the three locking sliders, and the three first stopping and position-limiting parts, the three pawls and the three second stopping and position-limiting parts are arranged in sequence at intervals circumferentially; side surfaces, for cooperating with the locking slider, of the first stopping and position-limiting part and the second stopping and position-limiting part are parallel to each other and arranged symmetrically with respect to the rotation center.

15. The seat angle adjustment device according to claim 14, wherein side surfaces, for cooperating with a side of the pawl near the rotation center, of the first stopping and position-limiting part and the second stopping and position-limiting part are parallel to each other and arranged symmetrically with respect to the rotation center; and a side surface, for cooperating with a side of the pawl away from the rotation center, of the second stopping and position-limiting part is configured to abut against the pawl in a case that the rotational torque is greater than the second preset torque value.

16. The seat angle adjustment device according to claim 15, wherein the ratchet wheel has a first projection part extending outwards axially, and the stop plate has a second projection part extending outwards axially; and the first projection part and the second projection part are configured to be respectively connected to a seat back and a seat base which are hinged together, or to the seat base and the seat back which are hinged together.

17. The seat angle adjustment device according to claim 16, further comprising a jacket fixedly connected to the stop plate, wherein the jacket is mounted outside the ratchet wheel, and a clearance fit is formed between the jacket and the ratchet wheel.

18. A seat, comprising a seat back and a seat base which are hinged together, and a seat angle adjustment device connected between the seat back and the seat base, wherein the seat angle adjustment device is the seat angle adjustment device according to claim 1.

\* \* \* \* \*